United States Patent [19]
Packer et al.

[11] Patent Number: 5,818,828
[45] Date of Patent: Oct. 6, 1998

[54] HYBRID MULTIPLE ACCESS PROTOCOL FOR WIRELESS FREQUENCY HOPPING MICROCELLS WITH ADAPTIVE BACKHAUL AND HEARTBEAT

[75] Inventors: Robert Lawrence Packer, Los Gatos; Milton Y. Xu; John Bettendorff, both of San Jose, all of Calif.

[73] Assignee: Metricom, Inc., Los Gatos, Calif.

[21] Appl. No.: 726,463

[22] Filed: Oct. 4, 1996

[51] Int. Cl.$^6$ .................................................. H04L 12/403
[52] U.S. Cl. ........................................... 370/346; 370/347
[58] Field of Search ..................................... 370/365, 366, 370/346, 347, 348, 350, 337, 321, 314, 442, 443, 444, 445, 447, 448, 449, 455, 458, 461, 462; 340/825.5, 825.51, 825.52, 825.08; 375/356

[56] References Cited

U.S. PATENT DOCUMENTS 5,574,979  11/1996  West ........................................ 375/357

OTHER PUBLICATIONS

Kahn, Robert E., "The organization of computer resources into a packet radio network", AFIPS Conference Proceedings, 1975 National Computer Conference, May 19–22, 1975, Anaheim, California, pp. 177–186.

Kahn, Robert E., "The Organization of Computer Resources into a Packet Radio Network", IEEE Transactions on Communications, vol. COM–25, No. 1, Jan. 1977, pp. 169–178.

Kahn, Robert E., "Advances in Packet Radio Technology", Proceedings of the IEEE, vol. 66, No. 11, Nov. 1978, pp. 1468–1496.

Tobagi, Fouad A., "Multiaccess Link Control", Computer Network Architectures and Protocols, Second Edition, Carl A. Sunshine, editor, 1989, Chapter 6, Section V, pp. 168–184.

Tobagi, Fouad A., "Modeling and Performance Analysis of Multihop Packet Radio Networks", Proceedings of the IEEE, vol. 75, No. 1, Jan. 1987, pp. 135–155.

*Primary Examiner*—Dang Ton
*Attorney, Agent, or Firm*—Townsend & Townsend & Crew LLP; Kenneth R. Allen

[57] ABSTRACT

In a wireless frequency hopping communication system, a protocol, which does not employ carrier sense or collision detect, is provided for allocating bandwidth fairly and efficiently under varying load conditions, wherein a node is permitted random access to the medium bandwidth under light loading conditions and wherein under higher loading conditions a time/bandwidth allocation is made with a portion of the allocation dedicated to inband backhaul tasks by introducing a form of polling, the size of the reserved time/bandwidth allocation being selected based on traffic pattern. Under such heavy load conditions, non-slave traffic is allocated bandwidth in slots as pseudo-slave packets to guarantee a share of the bandwidth. Depending on the activity of the population of packets, including responsiveness and trend of responsiveness, the relative size of the slots is determined. Random access is always permitted for certain classes of packets, namely handshake packets, which are used to establish the master/slave relationships between nodes, no matter how a node is loaded. Once a master/slave relationship is established, a slave is only allowed to use the random access method to inform its master that it has data pending for transmission to the network when the node has a light load. Polling is always employed when the node at least has one active slave. According to one aspect of the invention, the size of the reserved allocation is based on a variable heartbeat of a multicast poll. Further in accordance with the invention, a handshaking between master and slave permits transition between operation in a random access mode and a polled mode.

7 Claims, 2 Drawing Sheets

HYBRID MULTIPLE ACCESS PROTOCOL FOR WIRELESS FREQUENCY HOPPING MICROCELLS WITH ADAPTIVE BACKHAUL AND HEARTBEAT

BACKGROUND OF THE INVENTION

This invention relates primarily to wireless frequency hopping multiple access digital communication techniques and more particularly to a method for allocating bandwidth to multiple peer communication devices fairly and efficiently without carrier sense or collision detect mechanisms under varying load conditions.

Many multiple access protocols are known, including some which combine polling and random access. Known schemes require some form of collision detect or carrier sense mechanism. A useful tutorial and examples of the state of the art are found in an article by Stanford University Professor F. A. Tobagi entitled "Multiaccess Link Control," (*Computer Network Architectures and Protocols,* Second Edition, C. A. Sunshine, Editor, Plenum Press, 1989). A scheme is mentioned therein known as Resource Allocation Under Collision (RUC) in which an entire data channel is switched between a contention (random access ALOHA or slotted ALOHA mode) and a reservation mode, with the default mode being the contention mode. The entire channel is switched to the reservation mode until reservation has been cleared. Each scheme has its advantages and limitations, and that there is a need for a scheme which performs well according to several criteria, such as throughput, delay, distributed control, guaranteed delivery, and channel utilization, under a variety of traffic conditions. What is particularly needed is a protocol suited to the packetized wireless frequency hopping environment which has both the efficiency of random access and yet has the ability to guarantee that traffic will be carried via the communication medium, even under high traffic conditions.

SUMMARY OF THE INVENTION

According to the invention, in a wireless frequency hopping communication system, a protocol, which does not employ carrier sense or collision detect, is provided for allocating bandwidth fairly and efficiently under varying load conditions, wherein a node is permitted random access to the medium bandwidth under light loading conditions and wherein under higher loading conditions a time/bandwidth allocation is made with a portion of the allocation dedicated to inband backhaul tasks by introducing a form of polling, the size of the reserved time/bandwidth allocation being selected based on traffic pattern. Under such heavy load conditions, non-slave traffic is allocated bandwidth in slots as pseudo-slave packets to guarantee a share of the bandwidth. Depending on the activity of the population of packets, including responsiveness and trend of responsiveness, the relative size of the slots is determined. Random access is always permitted for certain classes of packets, namely handshake packets, which are used to establish the master/slave relationships between nodes, no matter how a node is loaded. Once a master/slave relationship is established, a slave is only allowed to use the random access method to inform its master that it has data pending for transmission to the network when the node has a light load. Polling is always employed when the node at least has one active slave. According to one aspect of the invention, the size of the reserved allocation is based on a variable heartbeat of a multicast poll. Further in accordance with the invention, a handshaking between master and slave permits transition between operation in a random access mode and a polled mode.

The invention will be better understood by reference to the following detailed description in connection with the accompanying drawings.

DESCRIPTION OF SPECIFIC EMBODIMENTS

The disclosure of this invention presupposes some familiarity with the operation of a wireless multiple access communication system, such as the Ricochet frequency hopping system originating with Metricom, Inc. of Los Gatos, Calif. In that system, a network of packet radio communication nodes which are designed as intelligent, autonomous and peer radio transmission and relay stations, transmit, acknowledge and relay autonomous packets among themselves, typically in a multiple channel environment where the transmitters and receivers frequency hop among channels in a trackable, pseudo random pattern. The typical and default communication mode is random access. Protocols used by the relay stations, herein terminal node controllers (TNCs), known as MCDN link and network layer protocols, as referred to and described in U.S. patent application Ser. No. 08/268,765 filed Jun. 28, 1994, now U.S. Pat. No. 5,570,084 do not support polling for the terminal link. By this invention, a polled mode is provided whereby certain node devices slave themselves to their "Best Node" as determined by various factors, so they can be polled in a duplex link protocol for communication of traffic or in a listening mode for periodic multicast idle poll. The object is to achieve a balance between system access fairness and transmission efficiency while providing support for prioritized traffic. Overall delay should not be made deterministic and fair at the expense of a significant increase in average delay of a packet transmitted through the system. However, an increase in reaction delay, commensurate with node inactivity, is tolerable. A hybrid between a random access peer to peer protocol and a polling protocol has the added benefit of making a network less vulnerable to overlying demanding users and also reduces the need for highly accurate timing among TNCs.

To implement the option of a mode switch between a peer to peer mode and a poll mode, data bits are employed in the link level of the protocol. Two data Link Capabilities bits are used to signify that a TNC can act as a master or as a slave.

Figure 1:
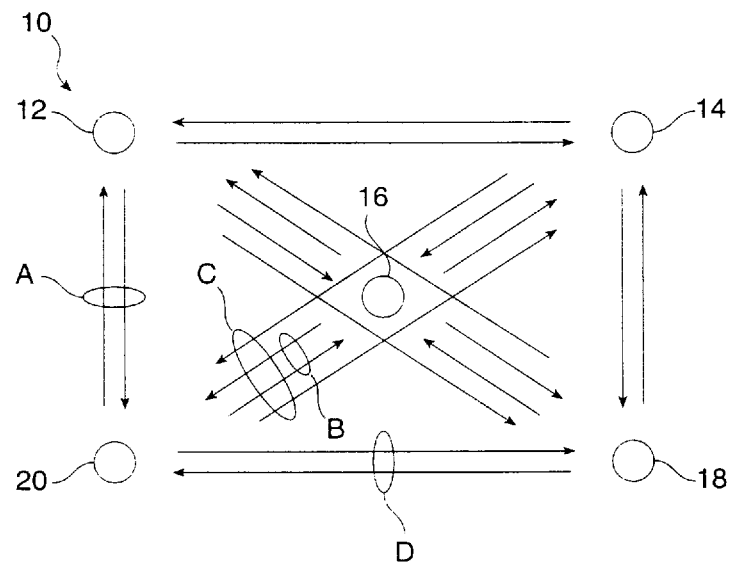
FIG. 1 is a representation of the system operating in the peer to peer mode.

Referring to FIG. 1, there is shown a representation of a simple closed system 10 operating in a pure peer to peer mode. In this mode, shown here for five nodes 12, 14, 16, 18, 20 there is ideally four two-way wireless links between every node. Highlighted in FIG. 1 are links A, B, C and D for node 20. These links carry protocol information and traffic for use or relay among the nodes in the system. In a five-node system, there are a maximum of ten links possible, each being reversible, in half-duplex operation. (In operation, any one half-link might be transmitting, while all nodes (minus one) must be listening for a packet addressed to it.) The possibility exists of multiple collisions.

Figure 2:
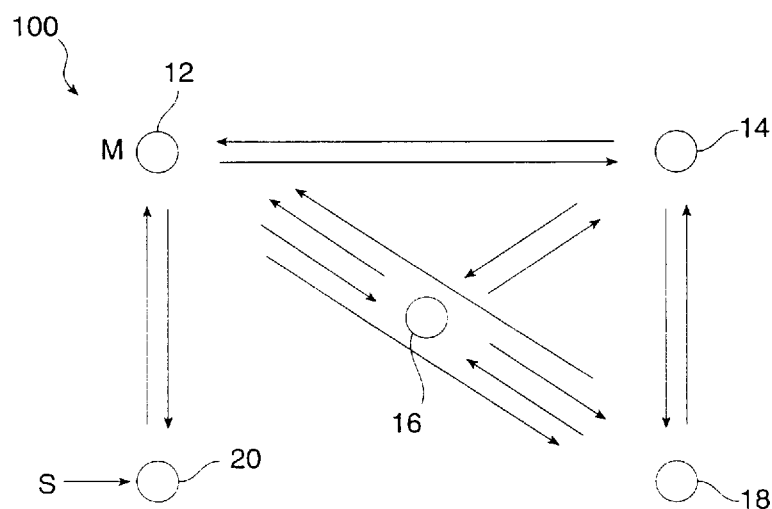
FIG. 2 is a representation of the system with one node operating only in a slave mode to another node operating in a master mode.

Referring to FIG. 2, there is shown a representation of a simple five-node closed system 100 with one node 20 operating in a slave mode to another node 12, which is operating on both a master mode with node 12 and in a peer mode with the other nodes 14, 16, 18. Only links A can be activated by node 20. As a consequence signals are never communicated via links B, C and D, thus removing six of 19 possible collision sources from the system 10 and reducing the number of repetitions needed to communicate a packet. The consequence is of course that traffic between node 20 and nodes other than node 12 must be digitally relayed, or digipeated, causing a delay. The goal is to optimize the mode choice between peer and poll modes so communication is most efficient for any load. This requires load-sensing capabilities at either the slave or at the master. This also requires a handshaking capability according to a handshaking protocol to mode switch nodes in a manner that both master and slave know what is expected of each other at all times.

A number of mechanisms may be used to sense traffic load in a network and monitor fairness. For example, affected nodes may track packet acknowledgement times or message response times and as a result issue requests to switch modes in an attempt to reduce packet acknowledgement times or message response times. A node may be programmed to request mode switching simply to obtain data on which mode provides a faster response time. As another example, nodes may log the number of packet retries, or other measures of collisions, as a measure of relative efficiencies of modes. A goal in any case is minimum propagation delay of a message between a source node and a destination node.

One scenario of operation in the poll mode provides that a slave limit its traffic to a single link with a master and the master polls the slave on a deterministic basis. In a frequency hopping scheme, a preferred poll mode does not require that a potential slave node be limited to communicating with a potential master at all times. The frequency hopping sequence of the master may be employed for some communication sequences, and the frequency hopping sequence of the slave nodes may be employed for other communication sequences.

In particular, a potential slave node first sends a Poll Mode Attach request to its desired master node under the default peer to peer link protocol, causing the master node to invoke a handshaking protocol to transition to a master/slave or poll mode link protocol between the two nodes. The pole mode link protocol then dictates that unicast poll packets are sent periodically to each active slave node according on the slave node's hopping sequence. The slave node is thus assured of access to the master node on a deterministic basis. The unique hopping sequence for each slave node minimizes the possibility of interference from any transmitting source operating on less than all of the frequency channels used by the system.

The master may send out multicast polls (nonspecifically-directed polling packets) on its own hopping sequence, different from that of the master's hopping sequence, in order to give idle slave devices an opportunity to invoke assured access to the master.

In a still further refinement, since nodes may establish multiple contemporaneous communication links with other nodes by employing unicast packets and different contemporaneous hopping sequences, a node may operate substantially simultaneously in both the peer mode with some nodes, while operating in a poll mode with a selected master node.

It is a goal to maintain fairness. Fairness is measured in terms of delay per packet. Fairness can also be allocated by weighting the activity under the poll mode. The master may track activity of each slave it is to poll. More-recently-active slaves are polled more frequently, consequently experiencing less delay between polls. Groups of slaves are assigned a polling priority at the master node according to their last known state, such as active or inactive. (Mode may also be considered a state.) Delay between polling is distributed equally among nodes in the same state, unless the load exceeds capacity, at which point delay is distributed by the master across all states. A finite state machine in the master regulates fairness of access to slave nodes as well as non-slave nodes. It is the task of the master finite state machine to control and adaptively allocate radio bandwidth (all channels and all time slots) among slave nodes (operating in poll mode) and radio bandwidth (all channels and all time blocks) among non-slave nodes (operating in the peer mode), as well as to allocate time between poll mode and peer mode. According to the invention, radio bandwidth is first allocated between slave and non-slave traffic and then it is allocated within each reserved bandwidth according to node activity level, with active poll mode slave nodes given first priority and with active peer mode non-slave nodes given first priority within their respective bandwidths. A minimum guaranteed amount of time is allocated to the peer mode for random access. It should be noted that the master's poll mode finite state machine only regulates fairness to slaves. Only "bandwidth" is allocated to non-slave traffic. This unregulated bandwidth is subject to random contention among nodes.

Figure 3:
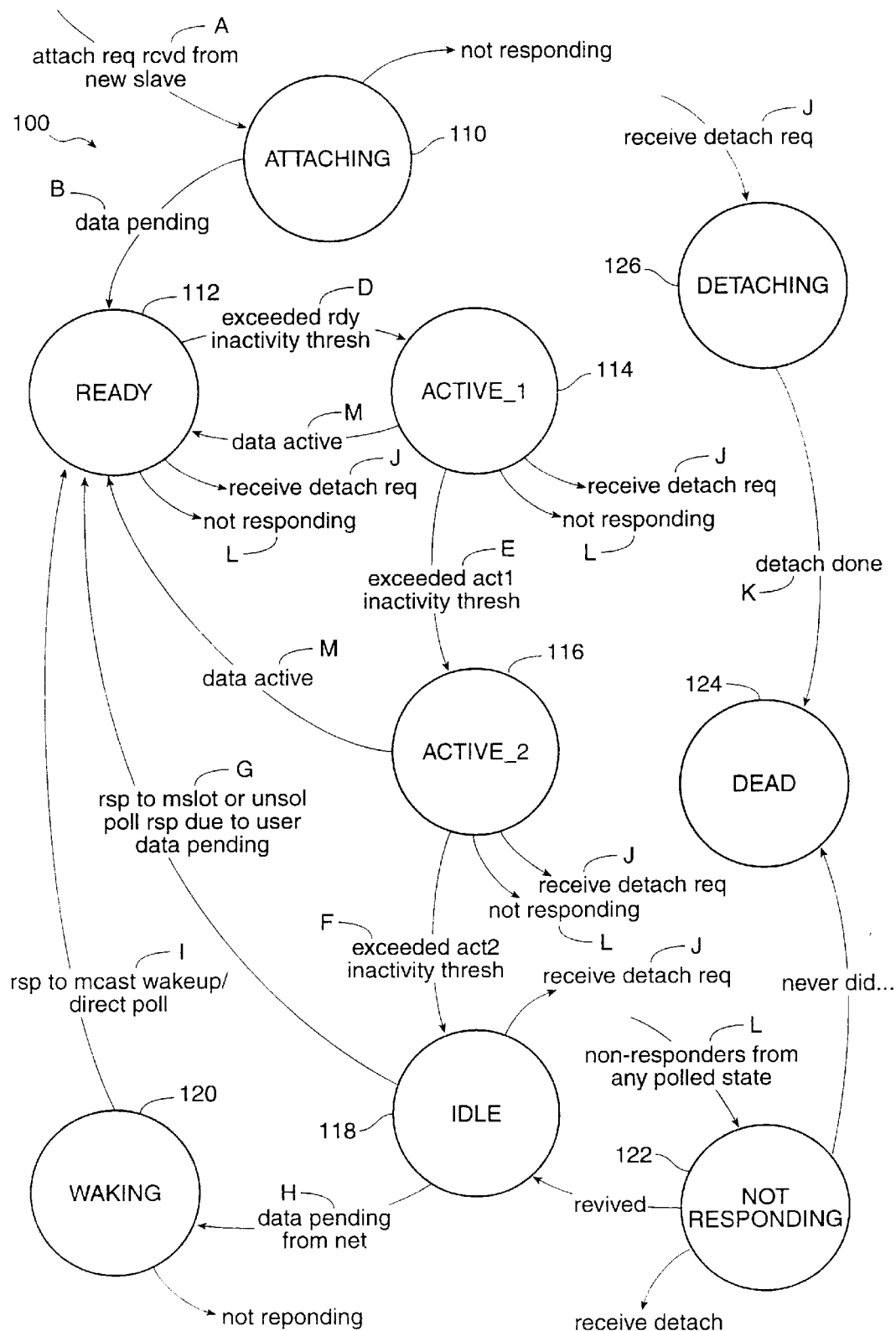
FIG. 3 is a diagram showing a master's view of a finite state machine in a slave node.

FIG. 3 is a block diagram showing a view of a master node 10 of the finite state machine 100 of a (potential) slave 20. The master recognizes the following states: attaching 110, ready 112, active (level 1) 114, active (level 2) 116, idle 118, waking 120, not responding 122, dead 124 and detaching 126. Transition paths are labeled according to function.

In operation, the slave approaches the master in the attaching state (110) as the master receives an attach request (A) when data is pending (B). An automatic ATTACH packet will only be sent if there is data pending. If it had data the last time it was polled, then the slave is assumed to be in the ready state 112. After completing the data transfer or has nothing further to communicate, the slave exceeds the inactivity threshold (D) and enters the Active_1 state 114. The Active_1 114 state has a target minimum delay time to be polled, while the Active_2 116 state has a sliding minimum time to be polled. The Active_2 116 state is entered after a first inactivity period (E). The Idle state 118 is entered after a second inactivity period (F) associated with the Active_2 state. The ready state 112 is entered from the active states 114, 116, whenever data is active.

In the Idle state 118, the slave can respond to data from the user (G) to enter the ready state 112. If there is data from the network (via the master) (H), the master puts the slave into the waking state 120. As implemented, the multicast poll has additional bits set so the slave(s) can respond to a multicast wakeup poll or to a direct poll (I). Thus, if the master gets any unsolicited poll response or a ready poll response, master views the slave as being in the ready state 112.

In the ready state, the slave is expected to receive a heartbeat (synch) signal and to dedicate a certain fraction of available listening time to listen for data from various source.

Other activities recognized in the master for states of the slave are detaching 126 (in response to a detach request J), dead 124 (when detach is done K) and not responding 122 (a default state from any nonresponders from any polled state L.)

By keeping track of the states of each of the TNCs which request access as slaves to a master TNC, the master TNC can manage the handshaking task and assure a smooth transition between poll mode and peer mode. The other tasks associated with operating with the peer mode depend on this handshaking task.

The invention has now been explained with reference to specific embodiments. Other embodiments will be apparent to those of skill in the art. It is therefore not intended that this invention be limited, except as indicated by the appended claims.

What is claimed is:

1. In a distributed control telecommunication system, a method for transitioning a first node between a first communication protocol and a second communication protocol, said second protocol being a slave mode wherein a second node communicates data with said first node when authorized by said first node according to a polling, said method comprising the steps of:

receiving at said first node a request from said second node as a candidate slave node, communicated in said first communication protocol, to permit communication according to said second communication protocol;

anticipating at said first node a current state of said second node based on prior history of communication;

establishing at said first node a state of attachment with said second node according to said second communication protocol in order to establish a link of said first node and said second node;

polling at said first node for data communication from said second node on mutually agreed upon channels and a first time schedule via said link;

monitoring, at said first node, said link via said mutually agreed upon channels according to said first time schedule for data transmission activity; and upon sensing a cessation of data transmission activity, polling at said first node for data communication from said second node on mutually agreed upon channels and a second time schedule via said link, said second time schedule being less frequent than said first time schedule.

2. The method according to claim 1, further including allocation time for said second node to establish links and to communicate with any node while remaining in a slave mode and in an attached state with said first node.

3. The method according to claim 2 wherein said second node can communicate and link contemporaneously according to said first communication protocol and said second communication protocol.

4. In a data communication system with distributed control of links between a plurality of nodes, a method for communicating packetized information via a common communication medium, including a plurality of channels according to a frequency hopping spread spectrum arrangement, among said plurality of nodes, said method comprising:

establishing from a first node a first link to a second node according to a first communication protocol, said first communication protocol permitting random transmissions of first addressed packets during a first time period;

establishing from a third node a second link to a fourth node according to a second communication protocol, said second communication protocol permitting transmissions of second addressed packets only according to authorization in response to a poll, said poll being invoked according to a first schedule during a second time period; and allocating available time alternately between exclusive time for said first time period and said second time period whereby random transmissions and polled transmissions can be made contemporaneously.

5. The method according to claim 4 wherein each said node can establish a plurality of contemporaneous links and wherein said first node is also said third node, said first node being a slave to control of said fourth node via said second link.

6. The method according to claim 4 wherein said poll is addressed less frequently to said third node in the absence of data transmission during a preceding polled transmission.

7. A data communication system with distributed control of links between a plurality of communication nodes for communicating packetized information via a common communication medium via a plurality of channels operative according to a frequency hopping spread spectrum communication arrangement among said plurality of nodes, said system comprising:

means, at least one of said plurality of communication nodes, for linking in a peer mode and contemporaneously for linking in a poll mode as a master and for allocating time of said communication arrangement between said poll mode and said peer mode;

means, at least one other of said plurality of communication nodes, for linking in said peer mode; and means, at least one other of said plurality of communication nodes, for linking in said poll mode as a slave to a master.

\* \* \* \* \*